United States Patent
Guan et al.

(10) Patent No.: US 9,286,127 B2
(45) Date of Patent: Mar. 15, 2016

(54) METHOD FOR ALLOCATING PROCESSOR RESOURCES PRECISELY BY MEANS OF PREDICTIVE SCHEDULING BASED ON CURRENT CREDITS

(71) Applicant: Shanghai Jiao Tong University, Shanghai (CN)

(72) Inventors: Haibing Guan, Shanghai (CN); Jian Li, Shanghai (CN); Ruhui Ma, Shanghai (CN); Zhengwei Qi, Shanghai (CN); Shuangshuai Jia, Shanghai (CN)

(73) Assignee: Shanghai Jiao Tong University, Shanghai (CN)

( * ) Notice: Subject to any disclaimer, the term of this patent is extended or adjusted under 35 U.S.C. 154(b) by 0 days.

(21) Appl. No.: 14/130,419

(22) PCT Filed: Jul. 5, 2013

(86) PCT No.: PCT/CN2013/078868
§ 371 (c)(1),
(2) Date: Dec. 31, 2013

(87) PCT Pub. No.: WO2014/114060
PCT Pub. Date: Jul. 31, 2014

(65) Prior Publication Data
US 2015/0339170 A1    Nov. 26, 2015

(30) Foreign Application Priority Data
Jan. 23, 2013    (CN) .......................... 2013 1 0025314

(51) Int. Cl.
*G06F 9/455*    (2006.01)
*G06F 9/46*    (2006.01)
(Continued)

(52) U.S. Cl.
CPC .......... *G06F 9/5038* (2013.01); *G06F 9/45533* (2013.01); *G06F 9/4881* (2013.01)

(58) Field of Classification Search
CPC ............ G06F 9/45558; G06F 9/45533; G06F 9/4881; G06F 9/5077; G06F 2209/5021; G06F 9/5027; G06F 11/2097
See application file for complete search history.

(56) References Cited

U.S. PATENT DOCUMENTS

| | | | | |
|---|---|---|---|---|
| 2010/0223611 A1* | 9/2010 | Mahalingam | ....... | G06F 9/45537 718/1 |
| 2011/0035752 A1* | 2/2011 | Krishnakumar | ...... | G06F 9/4881 718/103 |

(Continued)

FOREIGN PATENT DOCUMENTS

| CN | 101408853 | 4/2009 |
|---|---|---|
| CN | 102253857 | 11/2011 |
| CN | 103064746 | 4/2013 |

OTHER PUBLICATIONS

Matthew Danish et al.; Virtual-CPU Scheduling in the Quest Operating System; 2011 IEEE; pp. 169-179; <http://ieeexplore.ieee.org/stamp/stamp.jsp?tp=&arnumber=5767149>.*

(Continued)

*Primary Examiner* — Thuy Dao
*Assistant Examiner* — Cuong V Luu
(74) *Attorney, Agent, or Firm* — Dority & Manning, P.A.

(57) ABSTRACT

The present invention discloses a method for allocating processor resources precisely by means of predictive scheduling based on current credits, wherein the run queue of the Credit scheduler comprises virtual central processing units (VCPUs) with UNDER priority located at the head of the queue, VCPUs with OVER priority, VCPUs with IDLE priority located at the end of the queue and a wait queue for saving all VCPUs with overdrawn credits. Based on credit values of VCPUs, the method predicts the time of the credit overdrawing, and sets a timer which is triggered after the time to notify the Credit scheduler to stop scheduling corresponding VCPU. Thus the method effectively controls credit consumption and achieves the object of precise allocation of processor resources. The method is suitable to multi-core environment, and is also capable of reserving the advantages of the existing Credit scheduler, which are quick response for small task loads and load balancing.

8 Claims, 2 Drawing Sheets

(51) Int. Cl.
*G06F 9/50* (2006.01)
*G06F 9/48* (2006.01)

(56) References Cited

U.S. PATENT DOCUMENTS

| | | | | |
|---|---|---|---|---|
| 2011/0179417 | A1* | 7/2011 | Inakoshi | G06F 9/45558 718/1 |
| 2012/0054762 | A1* | 3/2012 | Moon | G06F 9/5077 718/103 |
| 2012/0174098 | A1* | 7/2012 | Tanikawa | G06F 9/4825 718/1 |
| 2012/0291027 | A1* | 11/2012 | Chiang | G06F 9/5077 718/1 |
| 2013/0167146 | A1* | 6/2013 | Dong | G06F 9/5033 718/1 |
| 2014/0245304 | A1* | 8/2014 | Zheng | G06F 9/45558 718/1 |

OTHER PUBLICATIONS

Hwanju Kim et al.; Task aware virtual machine scheduling for I/O performance; 2009 ACM; pp. 101-110; <http://dl.acm.org/citation.cfm?id=1508308>.*
Sisu Xi et al.; RT Xen Towards Real time Hypervisor Scheduling in Xen ; 2011 EMSOFT; pp. 39-48; <http://ieeexplore.ieee.org/stamp/stamp.jsp?tp=&arnumber=6064510>.*
Volkmar Uhlig et al.; Towards Scalable Multiprocessor Virtual Machines; 2004 VM; 14 pages; <http://citeseerx.ist.psu.edu/viewdoc/download?doi=10.1.1.10.4284&rep=rep1&type=pdf>.*
Edouard Bugnion et al.; Disco Running Commodity Operating Systems on Scalable Multiprocessors; 1997 ACM; pp. 412-447; <http://dl.acm.org/citation.cfm?id=265930>.*
Youngjin Kwon et al.; Virtualizing Performance Asymmetric Multi-core Systems; 2011 ACM; pp. 45-56; <http://dl.acm.org/citation.cfm?id=2000071>.*
PCT Search Report, Sep. 12, 2013.

* cited by examiner

METHOD FOR ALLOCATING PROCESSOR RESOURCES PRECISELY BY MEANS OF PREDICTIVE SCHEDULING BASED ON CURRENT CREDITS

FIELD OF THE INVENTION

The present invention relates to the technical field of computer system virtualization scheduling, and specifically relates to a method for allocating processor resources precisely by means of predictive scheduling based on current credits, so as to overcome the defects of inaccuracy when Credit scheduling algorithms allocate small amount of processor resources.

DESCRIPTION OF THE PRIOR ART

A virtual machine monitor (VMM) refers to providing a software management layer between hardware and traditional operating systems which abstracts the underlying hardware and provides virtual hardware interfaces for the upper layer. Thereby this enables multiple operating systems to run on the virtual hardware at the same time. Virtual machine management is primarily responsible for the management of hardware resources which include processor, memory and I/O. The relationship between a virtual machine monitor and virtual machines running on the virtual machine monitor or virtual machine operating systems, is as the relationship between a traditional operating system and processes.

The system virtualization technology based on virtual machine monitor is the basis of current cloud computing and data center underlying building. The system virtualization technology provides efficiency of execution and isolation of resources management. It helps enterprises to integrate services running on multiple physical servers onto a single physical server. Thus, enterprises can make full use of hardware resources, and reduce the cost on IT infrastructure. In addition, running virtual operating systems on a virtual machine management is beneficial to transplanting the legacy software systems. The isolation provided by the system virtualization technology can ensure that a virtual machine's execution does not affect other virtual machines' execution. The isolation includes security isolation and performance isolation. The security isolation means that one virtual machine's running error or crash can not affect other virtual machines' normal running on the same host. And the so-called performance isolation means that system resources consumption of one virtual machine can not affect other virtual machines' resources initially allocated by the system.

For introducing the middle layer, the virtual machine monitor, between hardware and virtual operating systems, the performance of the system must be affected. At present the main research focuses on the impact on the system processor throughput introducing the virtualization software layer, and pays less attention on how the virtual machine monitor concretely allocates processor resources.

Because it has the following advantages, the existing Credit scheduler stood out from multiple schedulers provided by Xen platform and has become the default scheduler:

1. A significant advantage of the existing Credit scheduler is the characteristics of multi-core load balancing. In multi-core environment, it can effectively allocate virtual central processing units (VCPUs) to idle physical processors according to the loads of each physical processor and thereby make use of system resources efficiently.

2. The existing Credit scheduler is capable of reserving certain Credit value for each idle VCPU. The value is proportional to the scheduling time slice. Because of the idle time slice, the system can respond rapidly to execute it whenever a small task requests.

But the existing Credit scheduler uses a penalty mechanism for credit overdrawing to manager credits of the VCPUs. A VCPU can make overdrawing in every time slice. This leads to the VCPU get more processor time in the time slice than expected in configuration. Because of excessive credit overdrawing in this round, the Credit scheduler will stop scheduling the VCPU in the following time slices to punish, thereby ensure equitable allocation of processor resources as a whole. The disadvantage of this method is unable to provide effective resources isolation in a short time.

Xen is an open source virtual machine monitor, which can run multiple virtual operating systems to make full use of hardware resources. The Credit scheduler implemented in the existing Xen is capable of equitably allocating central processing unit (CPU) resources to each VCPU in Non-Working-Conserving Mode (NWC-mode). But the existing Credit schedulers use a penalty mechanism for overdrawings to manager credits. In the mechanism, each VCPU can use more credit than expected being allocated. The overdrawn credit is negative. The VCPU with the overdrawn credit will be penalized and will not be scheduled in the following scheduling period until the VCPU gets a new credit which makes the credit turn to positive. This will not ensure that the VCPU gets corresponding proportion of CPU time accurately in every scheduling period. Therefore, the existing Xen Credit scheduler cannot ensure the isolation of each VCPU in a short time. The experiments show that when Xen Credit scheduler works in NWC-mode, allocating processor resources has a larger error, which gets worse when the target allocated is smaller. And when the number of virtual machines increases, the accuracy of allocating processor resources drops.

SUMMARY OF THE INVENTION

Given the defects of the prior art, the technical problem to be solved in the present invention is to provide a method for allocating processor resources precisely by means of predictive scheduling based on current credits. The method overcomes the defect of a large error of allocating processor resources of the Credit scheduler and effectively controls credit overdrawing.

To achieve the above object, the present invention predicts when the credit begins overdrawing according to the credit of each VCPU, and introduces timers to notify the Credit scheduler as scheduling event after the predicted time, so that the Credit scheduler stops scheduling the VCPU with overdrawn credit, thus ensures that each VCPU can only have expected configured processor time precisely in a scheduling period. Furthermore, the present invention also introduces a wait queue for saving the VCPUs with overdrawn credits. The purpose of introducing the queue is preventing the structure of the existing Credit schedulers from being affected. The scheduler based on the present invention can be compatible with the existing Credit schedulers and can keep the characteristic of the existing Credit schedulers undamaged.

The present invention provides a method for allocating processor resources precisely by means of predictive scheduling based on current credits, wherein the Credit scheduler sets up a run queue for each physical CPU, the run queue comprises VCPUs with UNDER priority located at the head of the run queue, VCPUs with OVER priority and VCPUs with IDLE priority located at the end of the run queue, and the run queue further comprises a wait queue for saving all VCPUs with overdrawn credit.

The method for allocating processor resources precisely by means of predictive scheduling based on current credits comprises the following steps:

step 1, whenever it is triggered, a Credit scheduler determines one or more VCPUs' credit values, for each of the credit values, if it has turned to negative or zero, the Credit scheduler adds the VCPU corresponding to the credit value to a wait queue and if it is positive, the Credit scheduler adds the VCPU corresponding to the credit value to the end of corresponding priority queue according to the priority of the VCPU;

step 2, the Credit scheduler successively selects the VCPU with the highest priority in the run queue to schedule for each idle physical CPU, and predict the time when the credit value will be used up according to the credit value of each scheduled VCPU;

step 3, set a timer which is triggered at the each time predicted in step 2 to notify the Credit scheduler that the credit of corresponding currently running VCPU has been used up;

step 4, in every period, while reallocating the credit for every active VCPU, if the Credit scheduler finds out a VCPU in the wait queue and the credit of the VCPU, because of the credit value reallocated, has turned from negative to positive, the Credit scheduler removes the VCPU from the wait queue and adds the VCPU to the head of the run queue.

Using above-mentioned method for allocating processor resources precisely by means of predictive scheduling based on current credits, the Credit scheduler predicts the time when the VCPU will execute, and is capable of timely stopping scheduling the VCPU when the credit of the VCPU has been used up. Thereby this prevents further credit value consumption, effectively controls that the Credit scheduler precisely allocates processor resources, and ensures isolation of processor resources of every VCPU.

The run queue further comprises a wait queue for saving all the VCPUs with overdrawn credits. The purpose of introducing the queue is preventing the structure of the existing Credit scheduler from being affected. The scheduler based on the present invention can be compatible with the existing Credit scheduler, so as to keep the characteristic of the existing Credit scheduler undamaged and reserve the characteristic of load balancing of the existing Credit scheduler.

Further, in step 2 of the method, converting takes place according to that 10 ms is equivalent to 100 credit value to predict the time when the credit value will be used up.

Further, in step 1 of the method, the Credit scheduler is triggered in every period and step 1 further comprising:

step 11, the Credit scheduler stops the VCPU running on the physical CPU corresponding to the current run queue.

Further, in step 1 of the method the Credit scheduler is triggered by the timer, and step 1 further comprising:

step 12, the Credit scheduler receives notification from the timer, and stops corresponding running VCPU.

The Credit scheduler stops corresponding currently running VCPU, so that this prevents further credit value consumption, effectively controls that the Credit scheduler precisely allocates processor resources, and ensures the isolation of each VCPU's processor resources. This can effectively provides the isolation of processor resources in a short time. At the same time, for ensuring each VCPU to get preconfigured processor time in every scheduling period, I/O response capabilities of the virtual machine have also been improved.

Further, the period in step 4 of the method is 30 ms.

The method of the present invention does not modify the slice length of the scheduling period, thereby idle VCPUs on Xen can still accumulate some credits, and this is beneficial to scheduling small task loads.

Further, step 4 of the method further comprising:

step 41, every 10 ms the Credit scheduler updates the credit values according to the running time of each currently running VCPU.

Further, step 4 of the method further comprising:

step 42, every 10 ms the Credit scheduler check for whether there is an idle physical CPU. If there is an idle physical CPU, the Credit scheduler schedules the VCPU with the highest priority in the run queue corresponding to the idle physical CPU.

Further, allocating credit values in step 4 of the method comprising:

step 43, the Credit scheduler adds active VCPUs in the wait queue to an active linked list;

step 44, the Credit scheduler allocates credits for the VCPUs in the active linked list according to Weight and Cap parameters.

In every period, the Credit scheduler reallocates a credit value for each active VCPU in the wait queue. If a VCPU gets new credit which makes the credit turn to positive, the VCPU can avoid not being scheduled in the following scheduling period because of overdrawing penalty mechanism. This ensures the isolation of each VCPU in a short time.

DETAILED DESCRIPTION OF THE PREFERRED EMBODIMENTS

Figure 1:
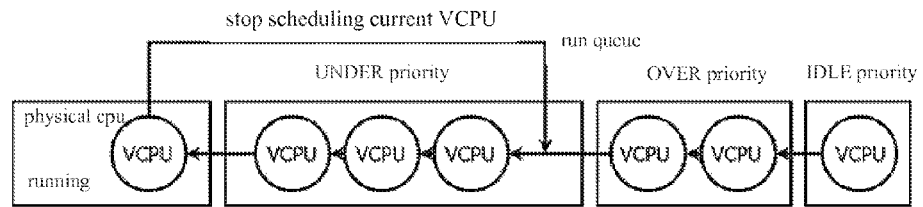
FIG. 1 is a structure schematic view of a run queue of the existing Credit scheduler.

Now referencing to the figures to further expound on the present invention:

FIG. 1 is a schematic view of a run queue of the existing Credit scheduler. The run queue mainly comprises three parts: VCPUs with UNDER priority located at the head of the queue, VCPUs with OVER priority, wherein UNDER priority is higher than OVER priority, and VCPUs with IDLE priority located at the end of the queue. When IDLE is running, the processor is in the idle state.

The first embodiment of the present invention is the method for allocating processor resources precisely by means of predictive scheduling based on current credits in single-core processor environment.

Figure 2:
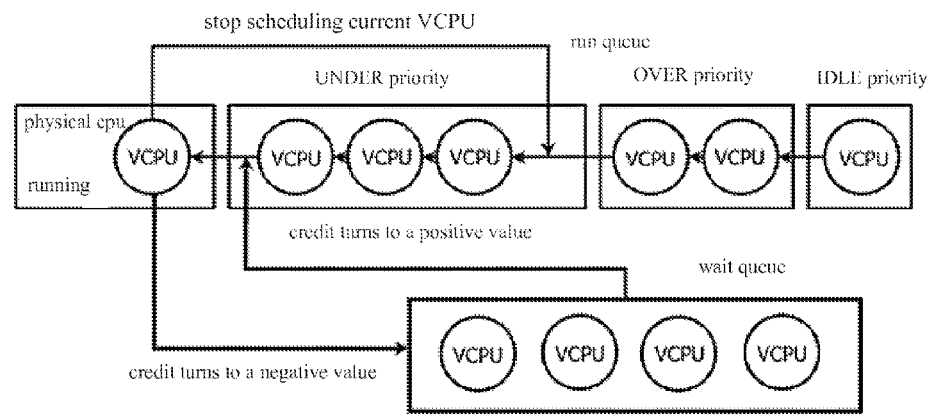
FIG. 2 is a structure schematic view of a run queue of the Credit scheduler of the first embodiment of the present invention.

FIG. 2 is a structure schematic view of a run queue of the Credit scheduler of the first embodiment of the present invention. Compared with the run queue of the existing Credit scheduler as shown in FIG. 1, the queue adds a new wait queue which saves all the VCPUs with overdrawn credit. The VCPUs with overdrawn credits refer to the credits which the VCPUs have are negative or zero.

Figure 3:
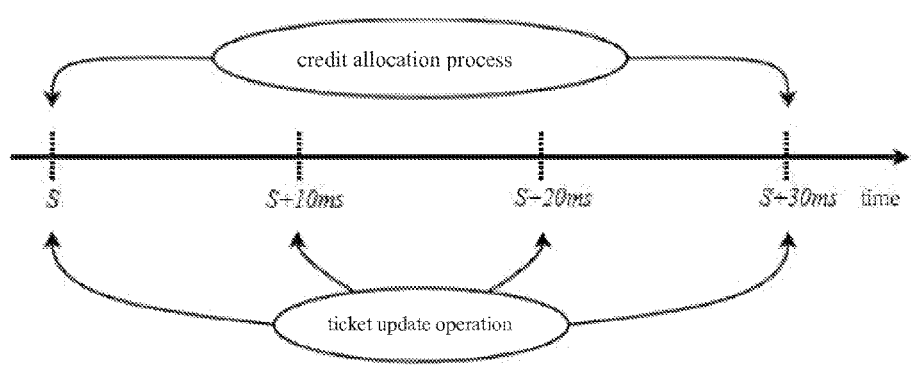
FIG. 3 is a schematic view of the credit allocation process of the Credit scheduler of the first embodiment.

FIG. 3 is a schematic view of the credit allocation process of the Credit scheduler of the first embodiment of the present invention. The existing Credit scheduler, every 30 ms, carries out a credit allocation, and every 10 ms, updates credits according to the running time of the VCPUs, and at the same time checks whether there is an idle physical CPU. If there is an idle physical CPU, the Credit scheduler may move the current VCPU to the idle physical CPU. Whether moving or not depends on some other constraints.

In the single-core processor environment, the method for allocating processor resources precisely by means of predictive scheduling based on current credits, comprising the following steps:

step 1, whenever it is triggered, the Credit scheduler stops the currently running VCPU and determines the currently running VCPU's credit value. If the current credit value has turned to negative or zero, the Credit scheduler adds the VCPU to a wait queue; if the current credit value is positive, the Credit scheduler adds the VCPU to the end of corresponding priority queue according to the priority of the VCPU.

step 2, the Credit scheduler selects the highest priority VCPU to schedule from the run queue for the physical CPU, and converts according to the credit value of the VCPU and the relation that 10 ms is equivalent to 100 credit value to predicts the time when the credit value will be used up.

step 3, the Credit scheduler sets up a timer which is triggered after the time predicted in step 2 to notify the Credit scheduler that the credit of currently running VCPU has been used up.

step 4, while every 30 ms the Credit scheduler reallocates the credit for each active VCPU, if the Credit scheduler finds out that one VCPU is in the wait queue, and that the credit of the VCPU has turned from negative to positive because of the credit value reallocated, the Credit scheduler removes the VCPU from the wait queue and adds the VCPU to the head of the run queue. Every 10 ms the Credit scheduler updates credits according to the running time of the VCPUs, at the same time the Credit scheduler checks whether the physical CPU is idle. If the physical CPU is idle, the Credit scheduler schedules the VCPU with the highest priority in the run queue.

The implementation of the method for scheduling in the present embodiment is divided into two parts. The first part is as follows:

step 1, when it stops the current VCPU, the scheduler selects the VCPU at the head of the run queue, and determines the credit value of the current VCPU. If the credit value is positive, adds the current VCPU to the end of corresponding priority queue by the way of an existing scheduler; otherwise, adds the current VCPU to the wait queue. The code of the step reads as follows:

```
svc_credit = atomic_read (&scurr->credit);
if (svc_credit > 0 || scurr->pri == CSCHED_PRI_IDLE) {
    if (scurr->pri == CSCHED_PRI_IDLE) {
        __runq_insert_tail(cpu, scurr);
    } else {
        __runq_insert(cpu, scurr);
    }
} else {
    __rdyq_insert(cpu, scurr);
    scurr->place = CSCHED_VCPU_OUT_QUEUE;
}
``` step 2, when the scheduler selects a new VCPU to run, according to the credit value of VCPU and the relation that 10 ms is equivalent to 100 credit value, the scheduler predicts the time when the credit of the VCPU makes a overdrawing.

step 3, the Credit scheduler sets up a timer according to the time predicted in step 2, and the timer asynchronously notifies the scheduler after the time, so that the Credit scheduler selects a new VCPU to run.

The code of step 2 and step 3 reads as follows:

```
svc_credit = atomic_read(&snext->credit);
if (svc_credit > 0)
{
    set_timer(&snext->trigger, NOW( )+
        CREDIT_TO_TIME(svc_credit));
}
```

The second part of the implementation of the method for scheduling in the present embodiment modifies the allocation process of the existing Credit scheduler. Specific steps are as follows:

step 1, the existing Credit scheduler allocates credits for the VCPUs in the active linked list according to Weight and Cap parameters. Before allocating concretely, it adds active VCPUs in the wait queue to an active linked list.

```
for_each_cpu_mask(cpu, prv->cpus)
{
    spin_lock_irqsave(&(CSCHED_PCPU(cpu)->rdyq_lock), flg);
        rdyq = RDYQ(cpu);
        list_for_each(iter, rdyq)
    {
        struct csched_vcpu *iter_svc = __rdyq_elem(iter);
        __csched_vcpu_acct_start(prv, iter_svc);
    }
    spin_unlock_irqrestore(&(CSCHED_PCPU(cpu)->rdyq _lock),
        flg);
}
```

The Credit scheduler sets a group (Weight, Cap) for each VCPU. The proportion between the Weights of the VCPUs decides the proportion of their respective CPU time slice. And a Cap decides an upper limit of the percentage of physical CPU time a VCPU may utilize. For example, Cap=50 represents that a VCPU may at most utilize half of a physical CPU time; Cap=100 represents that a VCPU may at most utilize one physical CPU time.

step 2, when one VCPU gets the reallocated credit, the Credit scheduler determines the credit value of the VCPU. If the credit value is greater than zero, the Credit scheduler removes the VCPU from the wait queue and adds the VCPU to the run queue.

```
if (svc->place == CSCHED_VCPU_OUT_QUEUE)
{
    svc->place = CSCHED_VCPU_ON_QUEUE;
    __rdyq_remove(svc);
    __runq_insert_head(svc->vcpu->processor, svc);
    cpu_raise_softirq(svc->vcpu->processor,
        SCHEDULE_SOFTIRQ);
}
```

The second embodiment of the present invention is the method for allocating processor resources precisely by means of predictive scheduling based on current credits in dual-core processor environment. The main differences with the first embodiment are including a first physical CPU, a second physical CPU, a first run queue corresponding to the first physical CPU and a second run queue corresponding to the second physical CPU, and determining the current credit values of VCPUs running on the first and second physical CPU.

In the present embodiment, the method for allocating processor resources precisely by means of predictive scheduling based on current credits, comprising the following steps:

step 1, whenever a Credit scheduler is triggered, the Credit scheduler adds a VCPU running on a first physical CPU to the wait queue of the first run queue if the credit value of the VCPU running on the first physical CPU has turned to negative or zero, and the Credit scheduler adds a VCPU running on the first physical CPU to the end of corresponding priority queue according to the priority of the VCPU running on the first physical CPU when the credit value of the VCPU running on the first physical CPU is positive. The Credit scheduler adds a VCPU running on the second physical CPU to the wait queue of the second run queue if the credit value of the VCPU running on the second physical CPU has turned to negative or zero, and the Credit scheduler adds a VCPU running on the second physical CPU to the end of corresponding priority queue according to the priority of the VCPU running on the second physical CPU when the credit value of the VCPU running on the second physical CPU is positive.

step 2, if the first physical CPU is idle, the Credit scheduler selects the VCPU with the highest priority in the first run queue to schedule, and predicts a first time when the credit value will be used up according to the credit value of scheduled VCPU; if the second physical CPU is idle, the Credit scheduler selects the VCPU with the highest priority in the second run queue to schedule, and predicts a second time when the credit value will be used up according to the credit value of scheduled VCPU.

step 3, according to the first time predicted in step 2, the Credit scheduler sets a first timer which is triggered after the first time to notify the Credit scheduler that the credit of the VCPU running on the first physical CPU has been used up; and according to the second time predicted in step 2, the Credit scheduler sets a second timer which is triggered after the second time to notify the Credit scheduler that the credit of the VCPU running on the second physical CPU has been used up.

step 4, every 30 ms the Credit scheduler reallocates credit for each active VCPU in the first run queue, and if the Credit scheduler finds out that one VCPU is in the wait queue of the first run queue and that the credit of the VCPU, because of the credit value reallocated, has turned from negative to positive, the Credit scheduler removes the VCPU from the wait queue of the first run queue and adds it to the head of the first run queue. Every 30 ms reallocating credit for each active VCPU in the second run queue, and if the Credit scheduler finds out that one VCPU is in the wait queue of the second run queue and that the credit of the VCPU, because of the credit value reallocated, has turned from negative to positive, the Credit scheduler removes the VCPU from the wait queue of the second run queue and adds it to the head of the second run queue. Every 10 ms, the Credit scheduler updates credits according to the running time of the VCPUs, at the same time checks whether there is an idle physical CPU. If there is an idle physical CPU, the Credit scheduler schedules the VCPU with the highest priority in the run queue corresponding the idle physical CPU. The Credit scheduler adds the active VCPU in the wait queue to active linked lists and allocates the credits for the VCPUs in the active linked lists according to Weight and Cap parameters.

In the environment with more than two physical CPUs, the method for allocating processor resources precisely by means of predictive scheduling based on current credits, is similar to the method of the present embodiment.

Using above-mentioned method for allocating processor resources precisely by means of predictive scheduling based on current credits, the Credit scheduler predicts the time when the VCPU will execute, and is capable of timely stopping scheduling the VCPU when the credit of the VCPU is used up. Thereby this prevents further credit value consumption, effectively controls allocating processor resources, and ensures the isolation of processor resources of each VCPU. Furthermore, the method is also capable of reserving the advantages of the existing Credit scheduler, which are quick response for small task loads and load balancing.

The ongoing description details the preferable embodiments of the invention. It should be understood that with the general technique of this field, no inventive work is necessary as to make multiple amendments and changes according to conception of this invention. Therefore, all the technical schemes gained from logical analysis, deductions or limited experimentation based on the present invention by technicians in this field, should be considered within the protection range asserted in the Claims.

The invention claimed is:

1. A method for allocating processor resources precisely by means of predictive scheduling based on current credits, wherein a Credit scheduler sets up a run queue for each of physical central processing units (CPUs), each of the run queues comprises virtual central processing units (VCPUs) with UNDER priority located at a head of the run queue, VCPUs with OVER priority, VCPUs with IDLE priority located at an end of the run queue, characterized in that, each of the run queues further comprises a wait queue for saving all VCPUs with overdrawn credits;

the method comprising the following steps:

step 1, whenever the Credit scheduler is triggered, the Credit scheduler determines credit values of one or more currently running VCPUs, for each of the credit values of the VCPUs, if it has turned to negative or zero, the Credit scheduler adds the VCPU corresponding to the credit value to corresponding wait queue and if the credit value of the VCPU is positive, the Credit scheduler adds the VCPU to an end of corresponding priority queue in corresponding run queue according to the priority of the VCPU corresponding to the credit value, step 2, the Credit scheduler selects the VCPU with the highest priority in corresponding run queue to schedule in sequence for each of idle physical CPUs, and predicts the times when the credit values will be used up according to the credit value of each of scheduled VCPUs;

step 3, the Credit scheduler sets a timer which is triggered at each of the time predicted in step 2 to notify the Credit scheduler that the credit of corresponding currently running VCPU has used up; and step 4, in every period, the Credit scheduler reallocates the credits for each active VCPUs, if the Credit scheduler finds out that one VCPU is in the wait queue, and that the credit of the VCPU, because of the credit value reallocated, has turned from negative to positive, the Credit scheduler removes the VCPU from the wait queue and adds the VCPU to the head of the run queue.

2. The method according to claim 1, wherein in step 2, the Credit scheduler converts a credit value according to that 10 ms is equivalent to 100 credit value to predict a time when the credit value will be used up.

3. The method according to claim 1, wherein the Credit scheduler in step 1 is triggered in every period, and step 1 further comprises:

step 11, the Credit scheduler stops the VCPUs running on the physical CPUs corresponding to the run queues.

4. The method according to claim 1, wherein the Credit scheduler in step 1 is triggered by the timer, and step 1 further comprises:

step 12, the Credit scheduler receives notification from the timer, and stops corresponding currently running VCPU.

5. The method according to claim 1, wherein the period in step 4 is 30 ms.

6. The method according to claim 1, wherein step 4 further comprises:
   step 41, every 10 ms the Credit scheduler updates credit values according to the running time of each of the currently running VCPUs.

7. The method according to claim 1, wherein step 4 further comprises:
   step 42, the Credit scheduler checks whether there are idle physical CPUs, if there are, the Credit scheduler schedules the VCPUs with the highest priority in the run queues corresponding to the idle physical CPUs.

8. The method according to claimed in claim 1, wherein allocating credits in step 4 comprises:
   step 43, the Credit scheduler adds active VCPUs in the wait queues to active linked lists;
   step 44, the Credit scheduler allocates credits according to Weight and Cap parameters for VCPUs in the active linked lists.

\* \* \* \* \*